Feb. 26, 1957 E. M. H. APPLEBY 2,782,639
ALTIMETERS
Filed Feb. 19, 1954 3 Sheets-Sheet 1

Feb. 26, 1957 E. M. H. APPLEBY 2,782,639
ALTIMETERS
Filed Feb. 19, 1954 3 Sheets-Sheet 3

United States Patent Office 2,782,639
Patented Feb. 26, 1957

2,782,639
ALTIMETERS

Ernest Mark Hedworth Appleby, Kempshott, near Basingstoke, England, assignor to Appleby & Ireland Limited, Kempshott, near Basingstoke, England, a British company Application February 19, 1954, Serial No. 411,511

5 Claims. (Cl. 73—386)

This invention comprises improvements in or relating to altimeters.

The invention relates to altimeters of the type which contain a pressure-sensitive capsule or equivalent element, movements of which due to variations in height are connected by magnifying mechanism to an indicating member, for example a pointer. It is an object of the invention to provide for the application of such altimeters to use at high altitudes. At very high altitudes it is necessary to allow the pointer or equivalent member to make more than one revolution within the range of the instrument if a reasonably open scale is to be used. As is known, the pressure differences at high altitudes for a given altitude difference are much smaller than the pressure differences for the same altitude difference at low altitudes, and this causes difficulty in producing an accurate instrument. Attempts have been made to overcome this difficulty by manufacturing capsules which have a constant variation of movement for a given altitude difference, but it is exceedingly difficult to manufacture such capsules with a reasonably close approximation to the law required, and the greater the height, the greater the difficulty.

According to the present invention, an altimeter comprises in combination a pressure-sensitive capsule or equivalent element, an altitude indicator comprising gearing to a movable indicating member which makes more than one revolution within the range of the instrument, and operative connections between the capsule and the gearing the velocity ratio of which, over successive ranges of the movement, so varies that the movements of the indicating member are substantially constant for a given altitude-difference at all heights. By arranging that the necessary variation in velocity ratio occurs in the operative connections between the capsule and the gearing, the difficulties referred to can be overcome in a simple manner and an accurate instrument produced, even for use at exceptional heights such as 90,000 to 100,000 feet.

In one form of instrument in accordance with the invention the operative connections include a cam device which is shaped in such a manner as to change the law of operation of the capsule in the required manner. Preferably the capsule is of the type in which constant differences of pressure produce constant displacements of the movable part of the capsule.

The following is a description by way of example of one possible construction in accordance with the invention:

Figure 1:
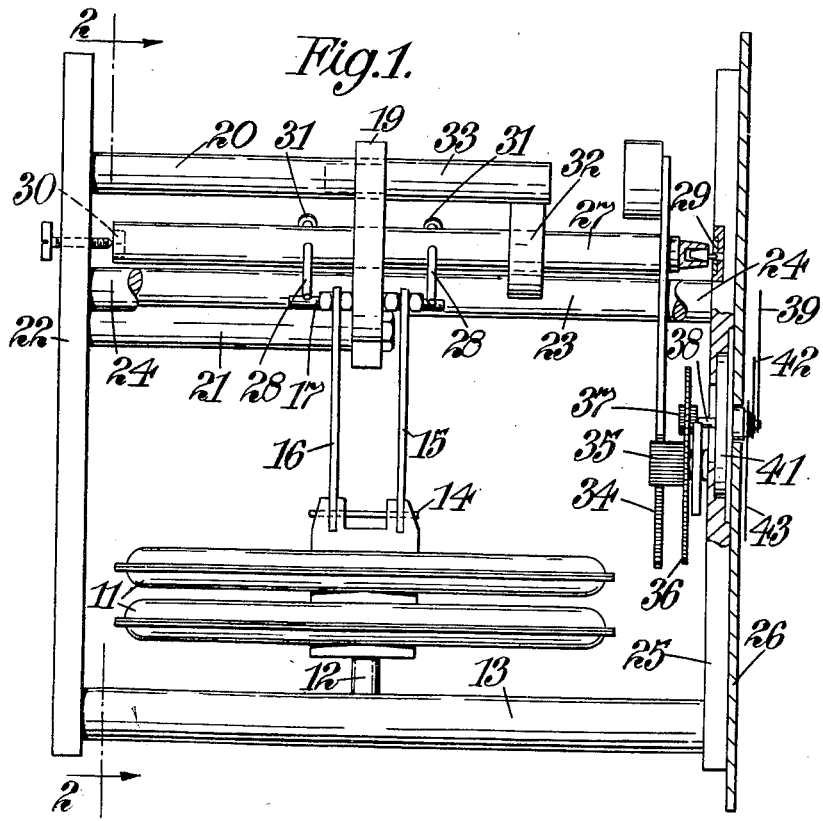
Figure 1 is a side elevation of the mechanism.

The instrument comprises a capsule assembly which consists of two or more corrugated capsules 11 in series with one another, the uppermost capsule being movable and the underside of the lower one fixed by a rod 12 to a frame-post 13. The capsules 11 are so manufactured that a given pressure difference will cause a given displacement at all pressures within the range of the instrument; that is to say the capsule-assembly has a linear law. Two intermediate links 15, 16 are pivoted at 14 to the movable element of the capsule and extend parallel with one another in approximately the direction of movement of the capsule into engagement with a roller bar 17 which is secured to them at their ends and is at right angles to the direction of movement. Movement of the capsule therefore moves the roller bar 17 parallel to itself. The centre of the roller bar passes through a slot 18 in a cam plate 19 and the slot is made of such shape that as the capsule-assembly 11 expands under decreasing atmospheric pressure the roller bar 17 is deflected laterally.

The cam plate 19 is supported on two posts 20, 21 from a frame plate 22. The plate 22 is connected by posts 13, 23, 24 to a second frame plate 25 which carries a dial 26.

Parallel with the roller bar 17 is a rock shaft 27 which carries two transmitting pins 28. The transmitting pins 28 extend radially from the shaft parallel to one another and rest upon the roller bar 17. The rock shaft 27 works on jewelled bearings 29, 30, one at each end. The tail ends of the transmitting pins 28 pass through the rock shaft 27 and carry counterweights 31 so that the rock shaft assembly is balanced against interference by gravitational forces. A hair spring 32 surrounds the rock shaft and urges the transmitting pins 28 into engagement with the roller bar 17. The hair spring is supported by an extension 33 of the post 20. The effect of the slot 18 in the cam plate 19 is to deflect the roller bar 17 toward the rock shaft as the altitude rises and thereby to increase the velocity ratio between the capsule and the rock shaft. The shape of the cam slot is made such that a given altitude difference will, at all altitudes, produce the same angular movement of the rock shaft.

Figure 4:
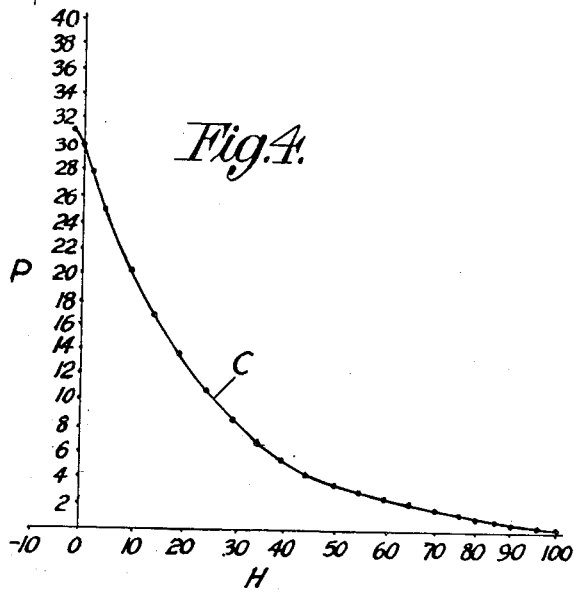
Figure 4 is an explanatory pressure-curve.
Figure 2:
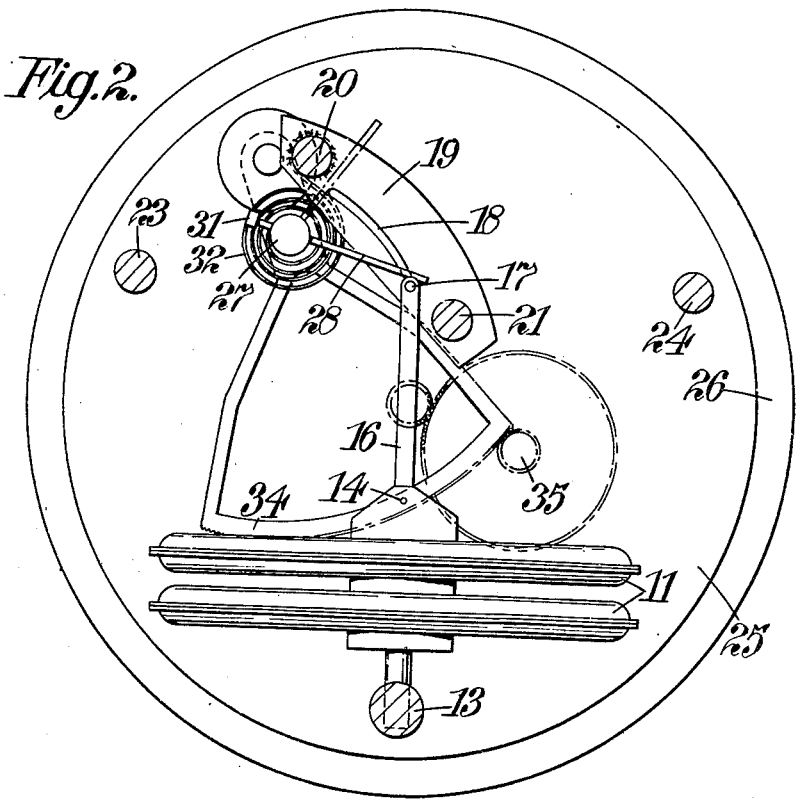
Figure 2 is a view taken in section upon the line 2—2 of Figure 1, looking in the direction of the arrows.
Figure 3:
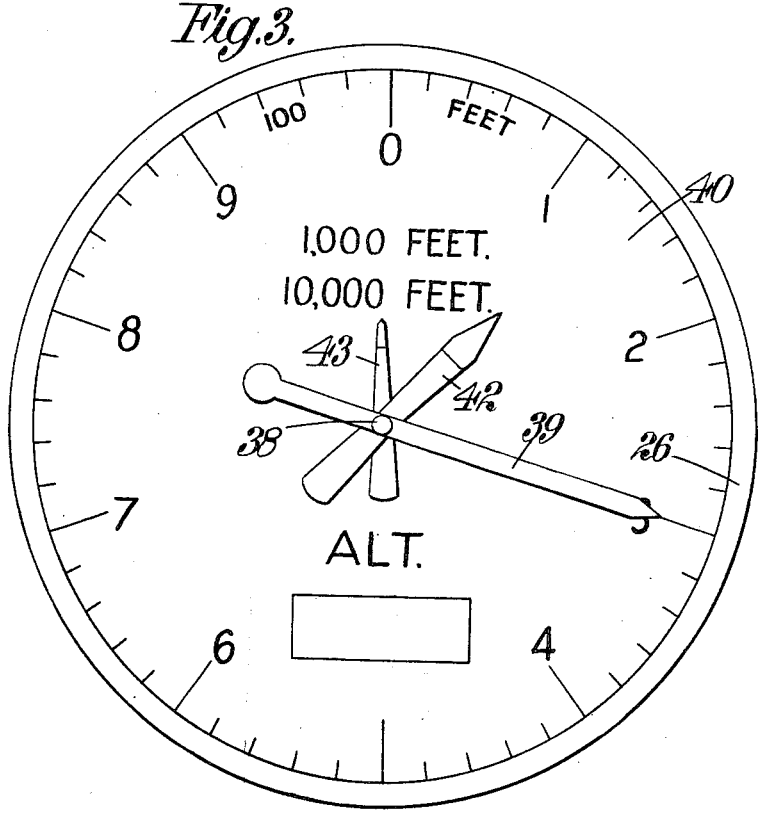
Figure 3 is a front view of the dial of the instrument.

Referring to Figure 4, this shows a curve C of pressure P plotted against height H. The height is marked in thousands of feet and pressure in inches of mercury. It will be seen that the pressure difference between 80,000 and 90,000 feet is only about 0.4 inch of mercury whereas between 0 and 10,000 feet it is 9.5 inches. This indicates the great alteration of velocity ratio called for, and which must be afforded by the slot 18. Actually the slot 18 as drawn would operate up to about 50,000 feet. Above that height it would have to approach nearer to the rock shaft 27.

The rock shaft 27 carries a gear sector 34 which meshes with a multiplying pinion 35, and the pinion 35 carries a gear wheel 36 which meshes with a second pinion 37 on the staff 38 of a pointer 39. The gearing between the rock shaft and the pointer is so proportioned that one revolution of the pointer 39 corresponds to an increase in altitude of 1,000 feet. The scale 40 is marked in hundreds of feet accordingly. The spindle 38 passes through a gear box 41 which contains reduction gears for second and third pointers 42, 43 which rotate respectively once in 10,000 feet and once in 100,000 feet and so show the number of thousands and ten thousands of feet which have been marked out by revolution of the pointer. Owing to the fact that the rock shaft 27 moves by a constant angular movement for a given height difference the revolutions of all the pointers are correct at all heights, and in this way it is possible to manufacture an instrument which will give altitude satisfactorily at heights as great as, say, 90,000 feet.

If desired, between the roller bar 17 and the capsule assembly 11 there may be inserted a booster, that is to say, a relay-operator servo-control which serves to apply a greater force to the cam mechanism. Such a device may be valuable at very high altitudes because the actuating forces available from the capsule decrease at such altitudes and require delicate mechanism to transmit them.

I claim:
1. An altimeter comprising in combination, a frame, a pressure-sensitive capsule thereon, a rock-shaft transverse to and spaced from the axis of the capsule, a lever arm on the rock shaft, a fixed guide-cam in a plane transverse to the rock shaft and having a contour which approaches the rock shaft in a spiral and is transverse to the lever arm, pivoted link means extending from the capsule toward the cam, a cam-follower operable along the cam contour by the link means, means on the cam-follower slidably engaged with said lever arm to operate the lever arm, and multiplying mechanism from the rock-shaft to pointer means, the cam-shape being such as to make pointer movement per unit height increment uniform throughout the range.

2. An altimeter as claimed in claim 1 wherein the frame consists of two parallel plates, the rock shaft ends being mounted on said plates, and wherein the cam is supported midway between and parallel to said plates by pillars carried by the frame, the capsule being supported between the plates on pillars and the multiplying mechanism is located close to and mounted on one of the plates, the pointer means being located outside these plates.

3. An altimeter as claimed in claim 1 wherein a counterweighted gear sector is rotatably mounted on the said rock shaft so as to mesh with a gear wheel on the said multiplying means whereby rotation of the rock shaft is transmitted to the multiplying means.

4. An altimeter comprising in combination, a frame, a pressure-sensitive capsule thereon, a rock-shaft transverse to and spaced from the axis of the capsule, lever arms on the rock shaft, a fixed guide-cam in a plane transverse to the rock shaft, a cam slot in the guide-cam the contour of which approaches the rock shaft in a spiral, a pair of link arms pivoted to and extending from the capsule towards the cam, the said link arms being spaced apart one on either side of the cam, a cam follower within the cam slot and extending from either side thereof into contact with the said link arms so as to be operable within the cam slot thereby, projections on the said link arms concentric with the cam follower to engage and operate the said lever arms, and a multiplying mechanism from the rock-shaft to pointer means, the cam shape being such as to make pointer movement per unit height increment uniform throughout the range.

5. An altimeter comprising in combination, a frame, a pressure-sensitive capsule thereon, a rock-shaft transverse to and spaced from the axis of the capsule, a fixed guide-cam in a plane transverse to the rock-shaft, and having a contour lying in the axis of motion of the capsule and which approaches the rock shaft in a spiral, a lever arm on the rock shaft extending transversely to the cam contour, link means pivoted to and extending from the capsule toward the cam, a cam-follower operable along the cam contour by the link means, means on the cam-follower to slidably engage and operate the lever arm, and multiplying mechanism from the rock-shaft to pointer means, the cam shape being such as to make pointer movement per unit height increment uniform throughout the range.

References Cited in the file of this patent

UNITED STATES PATENTS

| 1,641,195 | Roucka | Sept. 6, 1927 |
| 2,034,909 | Kollsman | Mar. 24, 1936 |
| 2,435,289 | Raney | Feb. 3, 1948 |

FOREIGN PATENTS

| 309,469 | Germany | Nov. 18, 1918 |
| 817,277 | France | May 24, 1937 |
| 655,952 | Germany | Jan. 26, 1938 |